United States Patent
Kim et al.

(10) Patent No.: US 7,397,957 B2
(45) Date of Patent: Jul. 8, 2008

(54) DISCRETE WAVELET TRANSFORM UNIT AND METHOD FOR ADAPTIVELY ENCODING STILL IMAGE BASED ON ENERGY OF EACH BLOCK

(75) Inventors: Dae-Won Kim, Seoul (KR); Hyun-Seung Lee, Suwon-si (KR); Dae-Kyu Shin, Seoul (KR)

(73) Assignee: Samsung Electronics Co., Ltd. (KR)

( * ) Notice: Subject to any disclaimer, the term of this patent is extended or adjusted under 35 U.S.C. 154(b) by 812 days.

(21) Appl. No.: 10/824,760

(22) Filed: Apr. 14, 2004

(65) Prior Publication Data
US 2005/0025372 A1 Feb. 3, 2005

(30) Foreign Application Priority Data
Jul. 28, 2003 (KR) .................. 10-2003-0052003

(51) Int. Cl.
*G06K 9/46* (2006.01)
*H04B 1/66* (2006.01)
*H04N 7/12* (2006.01)

(52) U.S. Cl. .............. 382/232; 375/240; 348/390.1

(58) Field of Classification Search ......... 382/232–253; 375/240, 240.01–240.29; 348/390.1, 421.1
See application file for complete search history.

(56) References Cited

U.S. PATENT DOCUMENTS

| | | | | |
|---|---|---|---|---|
| 4,447,886 A * | 5/1984 | Meeker | ............ | 382/248 |
| 5,014,134 A * | 5/1991 | Lawton et al. | ............ | 382/240 |
| 5,021,891 A * | 6/1991 | Lee | ............ | 382/250 |
| 5,321,776 A * | 6/1994 | Shapiro | ............ | 382/240 |
| 5,412,741 A * | 5/1995 | Shapiro | ............ | 382/232 |
| 5,453,945 A * | 9/1995 | Tucker et al. | ............ | 382/251 |
| 5,682,152 A * | 10/1997 | Wang et al. | ............ | 375/240.18 |
| 5,754,793 A * | 5/1998 | Eom et al. | ............ | 375/E7.046 |
| 5,828,849 A * | 10/1998 | Lempel et al. | ............ | 382/232 |
| 5,880,856 A * | 3/1999 | Ferriere | ............ | 382/233 |
| 6,526,174 B1 * | 2/2003 | Graffagnino | ............ | 382/236 |

(Continued)

OTHER PUBLICATIONS

Chang, S.G.; Bin Yu; Vetterli, M., "Adaptive wavelet thresholding for image denoising and compression," Image Processing, IEEE Transactions on, vol. 9, No. 9, pp. 1532-1546, Sep. 2000.*

(Continued)

*Primary Examiner*—Bhavesh M. Mehta
*Assistant Examiner*—Manav Seth
(74) *Attorney, Agent, or Firm*—The Farrell Law Firm, PC

(57) ABSTRACT

Disclosed is a discrete wavelet transform (DWT) unit for encoding and decoding still images based on the energy of each block. The DWT unit includes an energy calculating section for calculating energy of an input image in unit of a block having a predetermined number of pixels, an image decomposing section for performing three-level decomposition of the image of the block by decomposing a band at which a low frequency component is distributed three times, and a coefficient substituting section for substituting 0 (zero) for bands at which a high frequency component is distributed among the three-level decomposed bands.

32 Claims, 13 Drawing Sheets

U.S. PATENT DOCUMENTS

| | | | | |
|---|---|---|---|---|
| 6,535,647 B1* | 3/2003 | Abousleman | ............... | 382/253 |
| 7,142,598 B2* | 11/2006 | Kim et al. | ................... | 375/240 |
| 7,177,478 B2* | 2/2007 | Ville et al. | ................. | 382/245 |
| 7,239,754 B2* | 7/2007 | Akimoto et al. | ............. | 382/240 |
| 2004/0086042 A1* | 5/2004 | Kim et al. | .............. | 375/240.08 |
| 2005/0129319 A1* | 6/2005 | Lee et al. | .................... | 382/239 |

OTHER PUBLICATIONS

Zhong, J.M.; Leung, C.H; Tang Y.Y., "Image compression based on energy clustering and zero-quadtree representation," Vision, Image and Signal Processing, IEE Proceedings—, vol. 147, No. 6. pp. 564-570, Dec. 2000.*

* cited by examiner (a)

|     |     |
|-----|-----|
| 1LL | 1HL |
| 1LH | 1HH |

(b)

| 2LL | 2HL | 1HL |
|-----|-----|-----|
| 2LH | 2HH |     |
| 1LH |     | 1HH |

(c)

| 3LL | 3HL | 2HL | 1HL |
|-----|-----|-----|-----|
| 3LH | 3HH |     |     |
| 2LH |     | 2HH |     |
| 1LH |     |     | 1HH |

FIG.6

DISCRETE WAVELET TRANSFORM UNIT AND METHOD FOR ADAPTIVELY ENCODING STILL IMAGE BASED ON ENERGY OF EACH BLOCK

PRIORITY

This application claims priority to an application entitled "DISCRETE WAVELET TRANSFORM UNIT AND METHOD FOR ADAPTIVELY ENCODING STILL IMAGE BASED ON ENERGY OF EACH BLOCK" filed in the Korean Industrial Property Office on Jul. 28, 2003 and assigned Serial No. 2003-52003, the contents of which are hereby incorporated by reference.

BACKGROUND OF THE INVENTION

1. Field of the Invention

The present invention relates to a unit and method for performing a Discrete Wavelet Transform (DWT) and an Inverse Discrete Wavelet Transform (IDWT) in a Joint Photographic Experts Group standard (JPEG) 2000, and more particularly to a unit and method for performing the DWT and IDWT in the JPEG 2000 capable of adaptively encoding/decoding the DWT and IDWT based on the energy of each inputted image block at each time-domain in a coder/decoder (CODEC) of the JPEG 2000 in a proper manner.

2. Description of the Related Art

The JPEG standard, an international compression standard for continuous-tone still images, has been selected as a still image compression standard and has greatly served multimedia services through provision of a variety of computer applications and hardwires. However, the JPEG standard is restricted to its applicable field due to its limited performance. To be more specific, the limited performance of the JPEG standard is exemplified by a low compression capability, an un-integrated lossy/lossless compression system, a non-applicability of high capacity images, a low transmission stability under a noisy environment, a compression degradation of synthetic images such as graphics, compression deterioration of a compound document and so forth.

To overcome these problems of the JPEG standard, a JPEG 2000 standard has been proposed. The JPEG 2000 standard is a standard for the next generation of still images, which incorporates various functions into the JPEG standard. Particularly, a standardization of the JPEG 2000 standard is conducted by International Telecommunication Union Sub Group 8 (ITU-R SG8) and International Organization For Standardization/International Electronical Commission Joint Technical Committee 1/Sub Committee 29/Working Group 1 (ISO/IEC JTC1/SC29/WG1) at the same time. The JPEG 2000 standard endows one integrated code to various types of still images, which have different characteristics from each other, such as natural images, scientific images, medical images, remote sensing images, document images, graphic images and so on.

The JPEG 2000 standard can be variously used throughout all the fields associated with the still images, for example medical images, the Internet/WWW images, remote sensing, image archiving, graphics and computer synthetic images, facsimiles, printing and publishing images, laser images, digital camera, scanner and digital photocopier, economical documents, security camera, earth imaging, digital library for photographs and arts, camera phones and so on.

Recently, there emerged gradually increasing requirements to transmit an immense quantity of data at a very high speed in the environment of low transmission rate and narrow bandwidth, such as on a computer network, a public telephone network, a radio channel or the like, for communication of various multi-media.

Independently encoded/decoded moving pictures based on the Moving Picture Expert Group (MPEG) or the image codec H.26× or still images according to the JPEG standard, various techniques such as a Discrete Cosine Transform (DCT), (Discrete Wavelet Transform (DWT), Motion Estimation (ME) and Motion Compensation (MC) are used to perform data compression transformation based on a block of images, which are separated by a desired size. When data is transmitted using this data compression transformation, a transmission rate of data is low, and a minimum image quality, which a user considers to be satisfactory is not ensured.

According to technical advancements, a mobile communication system has advanced from an analog one, as the first generation, through a digital one, as the second generation, to an asynchronous Wideband Code Division Multiple Access (WCDMA) or International Mobile Telecommunications-2000 (IMT-2000). As a result, the mobile communication system has a capability to provide global broadband roaming services at a rapid speed. The asynchronous WCDMA has various functions, for example one for wireless multi-media services, one for transmitting/receiving images which is either playing moving images/still images on a terminal in a Video On Demand (VOD) mode or photographing the images with a camera and then performing a bi-directional communication between users of the mobile communication using their own terminals.

This WCDMA terminal has an increasing importance to a part taking charge of an internal modem function as well as a part taking charge of applications including multimedia functions. Therefore, a terminal in which WCDMA is employed is exposed to an increased burden of Central Processing Unit (CPU) used to process a variety of multimedia data including still, as well as an increased amount of calculation data. Therefore, in order to make efficient use of WCDMA communication system, there is additional necessity not only for a modem, which provides a basic function for communication, but also for a module and memory, which take charge of applications allowing amount of calculations and errors of multimedia data to be decreased.

Existing techniques for encoding/decoding moving images based on MPEG-1, 2 and 4 or H.26×as well as still images based on JPEG and JPEG 2000 include a DCT/Inverse Discrete Cosine Transform (IDCT) algorithm, a DWT/Inverse Discrete Wavelet Transform (IDWT) algorithm and so on. The DCT/IDCT algorithm divides each image frame of moving images into a block of an 8×8 size, and then performs encoding/decoding in unit of this block. The DWT/IDWT algorithm divides each image into tiles of a proper size in the JPEG 2000 standard for still images, and then performs encoding/decoding in unit of each tile or relative to a certain area including a plurality of the tiles.

As mentioned above, in the case of the JPEG 2000 standard for still images, the DWT/IDWT algorithm performs tiling of appropriately dividing the corresponding still image into respective tiles and performs encoding/decoding of each tile. When encoding/decoding each image tile, the DWT/IDWT algorithm performs encoding/decoding relative to all image coefficients forming the tiles. When an encoded image is restored by this technique, the restored image has a high definition. However, since image coefficients corresponding to the whole tiles must each be calculated, there are problems in that an amount of calculation becomes increased, and in that a complexity of the image becomes increased. Further, in order to encode/decode images using this technique, demands for a memory capable of storing complicated images and calculated results and for enough time to calculate the complicated images are satisfied, which results in another problem.

SUMMARY OF THE INVENTION

Accordingly, the present invention has been made to solve the above-mentioned problems occurring in the prior art, and an object of the present invention is to provide a discrete wavelet transform (DWT)/inverse discrete wavelet transform (IDWT) unit and method for reconstructing a still image using the same, capable of reducing calculation amount and time generated by encoding/decoding of all image coefficients forming tiles when the still image of JPEG 2000 is encoded/decoded.

It is another object of the present invention to provide a DWT/IDWT unit and method for reconstructing a still image using the same, capable of reducing memory capacity and hardware complexity needed to perform encoding/decoding of all image coefficients forming tiles when the still image of JPEG 2000 is encoded/decoded.

In order to accomplish these objects, according to one aspect of the present invention, there is provided a discrete wavelet transform (DWT) unit for encoding and decoding a still image, comprising: an energy calculating section for calculating energy of an input image in a unit of a block having a predetermined number of pixels; an image decomposing section for performing adaptive variable-level decomposition of the corresponding block according to a magnitude of an energy value calculated in a unit of the block; and a coefficient substituting section for substituting 0 (zero) for bands, at which a high frequency component is distributed, among the adaptive variable-level decomposed bands based on an energy value of the corresponding block and performing image reconstruction.

Preferably, the DWT unit further comprises a sub-sampling section for performing sub-sampling of reducing a pixel size of the input image by half before the energy calculating section calculates the energy of the input image. Further, the corresponding block decomposed by the image decomposing section is adaptively preformed by any one of one-level decomposition, two-level decomposition and three-level decomposition.

It is preferred that the image decomposing section equally divides a range between maximum and minimum values of the energy calculated by the energy calculating section into three ranges and sets the three equi-partitioned ranges into a first energy level, a second energy level and a third energy level in an order of magnitude of the energy, and determines a decomposition level according to which level the energy level of the corresponding block belongs to. Preferably, according to the range to which the energy value of the corresponding block belongs, the coefficient substituting section substitutes 0 (zero) for a coefficient of at least one band, at which a high frequency component is distributed, among the adaptive variable-level decomposed bands.

Thus, when the energy value of the corresponding block belongs to the third energy level, the image decomposing section performs a one-level decomposition of the corresponding block, and the coefficient substituting section substitutes 0 (zero) for a coefficient of band 1HH of the one-level decomposed bands. Further, when the energy value of the corresponding block belongs to the second energy level, the image decomposing section performs a one-level decomposition of the corresponding block, and the coefficient substituting section substitutes 0 (zero) for coefficients of bands 1HH, 1HL and 1LH of the one-level decomposed bands. Meanwhile, when the energy value of the corresponding block belongs to the first energy level, the image decomposing section performs two-level decomposition of the corresponding block, and the coefficient substituting section substitutes 0 (zero) for coefficients of bands 1HH, 1HL, 1LH and 2HH of the two-level decomposed bands. Additionally, when the energy value of the corresponding block belong to a negative value, the image decomposing section performs three-level decomposition of the corresponding block, and the coefficient substituting section substitutes 0 (zero) for coefficients of bands 1HH, 1HL, 1LH, 2HH and 3HH of the three-level decomposed bands.

In order to accomplish these objects, according to another aspect of the present invention, there is provided a method for reconstructing a still image using a DWT unit for encoding and decoding the still image, the method comprising the steps of: (a) calculating energy of an input image in unit of a block having a predetermined number of pixels at an energy calculating section; (b) performing adaptive variable-level decomposition of the corresponding block according to a magnitude of energy value calculated in the unit of the block at an image decomposing section; and (c) substituting 0 (zero) for bands at which a high frequency component is distributed among the adaptive variable-level decomposed bands based on an energy value of the corresponding block and performing image reconstruction at a coefficient substituting section.

Preferably, the method for reconstructing a still image further comprises a step of performing sub-sampling of reducing a pixel size of the input image by half before the energy is calculated in step (a). Further, the corresponding block decomposed in step (b) is adaptively preformed by any one of one-level decomposition, two-level decomposition and three-level decomposition.

Meanwhile, in step (b), a range between maximum and minimum values of the calculated energy is equally divided into three ranges to be set into a first energy level, a second energy level and a third energy level in order of magnitude of the energy, and a decomposition level is determined according to which level the energy level of the corresponding block belongs to. Further, in step c, a coefficient of at least one band, at which a high frequency component is distributed, among the adaptive variable-level decomposed bands is substituted by 0 (zero) according to the range to which the energy value of the corresponding block belongs.

Preferably, when the energy value of the corresponding block calculated in step a belongs to the third energy level, the corresponding block is subjected to one-level decomposition in step (b), and a coefficient of the band 1HH of the one-level decomposed bands is substituted by 0 (zero) in step (c). Further, when the energy value of the corresponding block calculated in step (a) belongs to the second energy level, the corresponding block is subjected to one-level decomposition in step (b), and coefficients of bands 1HH, 1HL and 1LH of the one-level decomposed bands are substituted by 0 (zero) in step (c).

Meanwhile, when the energy value of the corresponding block calculated in step (a) belongs to the first energy level, the corresponding block is subjected to two-level decomposition in step. (b), and coefficients of bands 1HH, 1HL, 1LH and 2HH of the two-level decomposed bands are substituted by 0 (zero) in step (c). Additionally, when the energy value of the corresponding block calculated in step (a) belong to a negative value, the corresponding block is subjected to the three-level decomposition in step (b), and the coefficients of bands 1HH, 1HL, 1LH, 2HH and 3HH of the three-level decomposed bands are substituted by 0 (zero) in step (c).

According to the present invention, by sub-sampling the source image, performing the three-level decomposition of each sub-sampled image block having a predetermined number of pixels, substituting 0 (zero) for coefficients of bands containing the high frequency component within the three-level decomposed blocks, the source image is reconstructed. As a result, it is possible not only to decrease the calculation amount and the time needed to perform encoding and decoding of the image, but also to further simplify a hardware-based construction.

Further, by sub-sampling the source image, calculating the energy values relative to the sub-sampled source images in the unit of a block having a predetermined number of pixels, equally dividing a range between the minimum and maximum values of the calculated energy values into three, performing three-level decomposition of the block, and substituting 0 (zero) for coefficients of some three-level decomposed bands according to which one of the three equi-partitioned ranges the energy value of the corresponding block belongs to, it is possible not only to decrease calculation amount and time needed to perform encoding and decoding of the images, but also to further simplify a hardware-based construction.

Moreover, by sub-sampling the source image, calculating the energy values relative to the sub-sampled source images in the unit of a block having a predetermined number of pixels, equally dividing a range between the minimum and maximum values of the calculated energy values into three, performing adaptive variable-level decomposition of the block according to which one of the three equi-partitioned ranges the energy value of the corresponding block belongs to, and substituting 0 (zero) for coefficients of bands having the high frequency component, it is possible not only to decrease calculation amount and time needed to perform encoding and decoding of the images, but also to further simplify a hardware-based construction.

BRIEF DESCRIPTION OF THE DRAWINGS

The above and other objects, features and advantages of the present invention will be more apparent from the following detailed description taken in conjunction with the accompanying drawings, in which:

FIG. 6 is a block diagram showing one example, which may be subjected to adaptive variable-level decomposition at the image decomposing section of FIG. 4;

DETAILED DESCRIPTION OF THE PREFERRED EMBODIMENT

Figure 1:
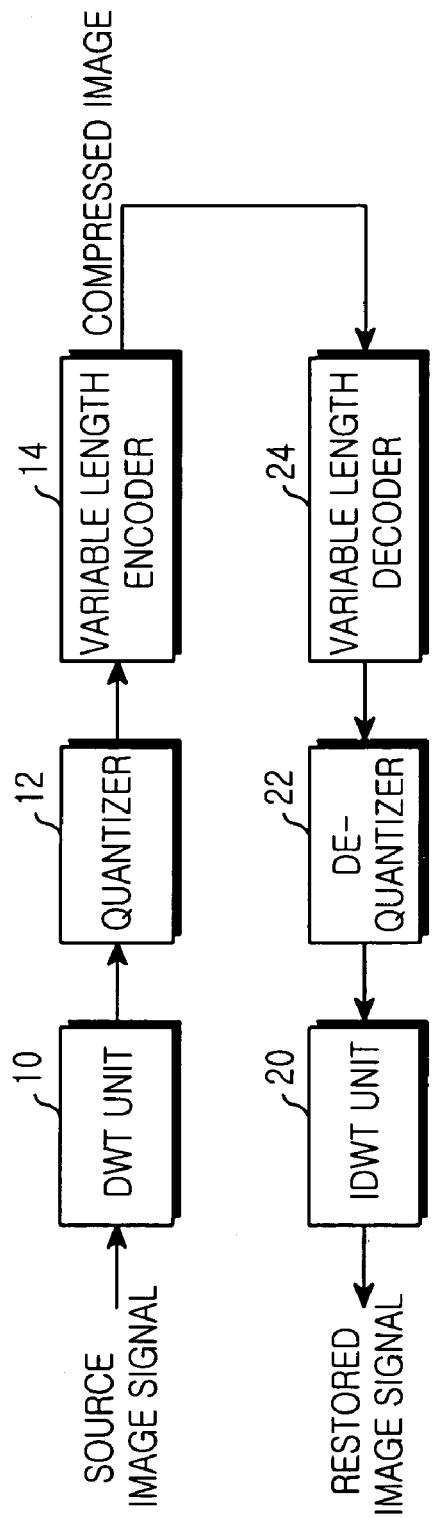
FIG. 1 is a schematic diagram showing a system for performing encoding/decoding of still images in a general JPEG 2000.

Hereinafter, preferred embodiments of the present invention will be described in detail with reference to the accompanying drawings. Above all, it should be noted that similar parts are given reference numerals and symbols as similar as possible even through they are indicated in different drawings. In the description of the present invention, a detailed description of known functions and configurations incorporated herein will be omitted when it may make the subject matter of the present invention unclear.

FIG. 1 is a schematic diagram showing a system for performing encoding/decoding of still images in a general JPEG 2000. As shown, the system for performing encoding/decoding of still images is divided into an encoding side of compressing still images and a decoding side of decoding the compressed still images.

The encoding side includes a Discrete Wavelet Transform (DWT) unit 10, a quantizer 12 and a variable length encoder 14. When a source image signal is inputted, the DWT unit 10 performs a discrete wavelet transform relative to the inputted image. The quantizer 12 performs quantization of the discrete-wavelet-transformed image in a unit of a block having a predetermined number of pixels. Here, the quantizer 12 scans quantization values of each block of the quantized image in the unit of the block in a zigzag pattern to output the quantization values to the variable length encoder 14. The variable length encoder 14 converts the quantization values inputted from the quantizer 12 into the variable length encoded data. In this case, the variable length encoder 14 outputs the variable length encoded data, or a compressed image, as an encoded continuous bit stream by means of a bit stream generator, which is not shown in the drawing.

The decoding side includes a variable length decoder 24, a de-quantizer 22 and Inverse Discrete Wavelet Transform (IDWT) unit 20. When the compressed image is inputted, the variable length decoder 24 performs variable length decoding relative to the compressed image to obtain quantization values of each block having a predetermined number of pixels. The de-quantizer 22 performs inverse quantization of the variable-length-decoded quantization values to obtain a discrete-wavelet-transformed image. The IDWT unit 20 performs IDWT relative to the inverse-qunatized discrete-wavelet-transformed images, so that a restored image is obtained.

Figure 2:
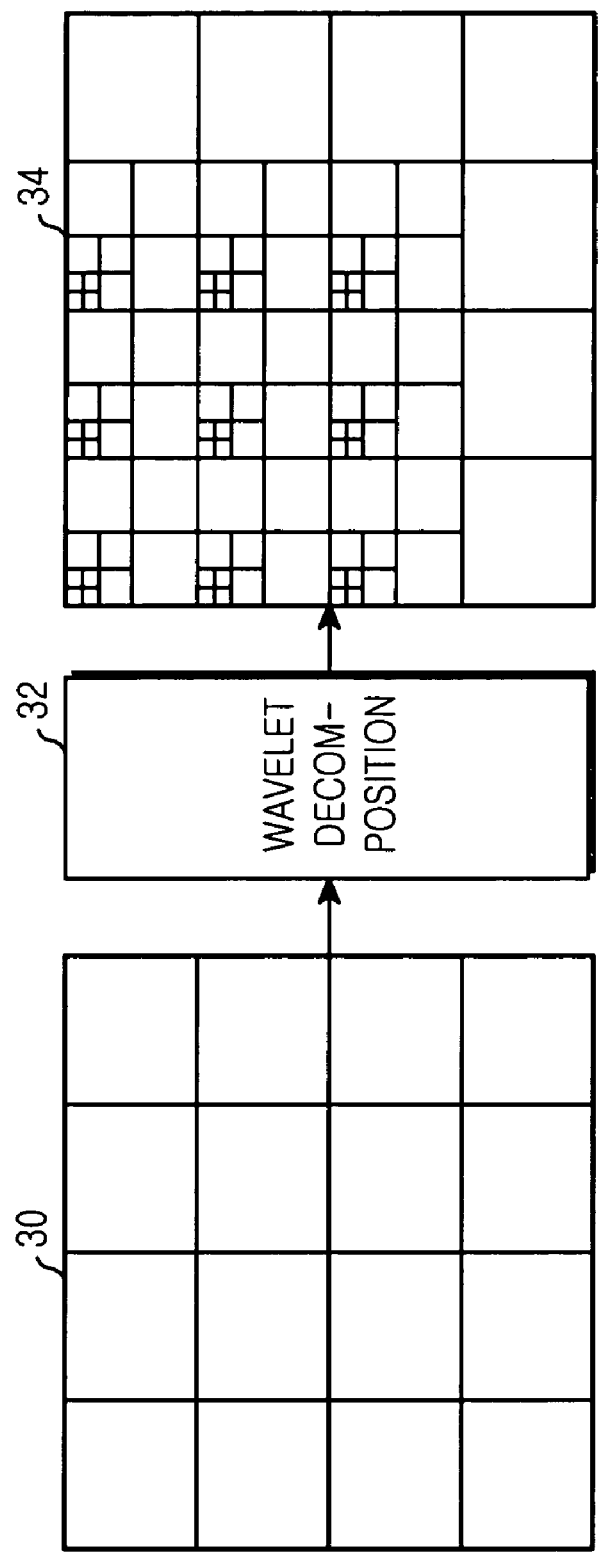
FIG. 2 is a block diagram explaining a signal conversion process of the DWT unit 10 of FIG. 1 when a source image signal is inputted.

FIG. 2 illustrates a signal conversion process of the DWT unit 10 of FIG. 1 when a source image signal is inputted. First, the DWT unit 10 performs tiling of a source image in the unit of a predetermined number of pixels to obtain tiled image blocks, as indicated by a reference numeral 30. Here, each of the tiled image blocks is subjected to wavelet decomposition, as indicated by a reference numeral 32, at the DWT unit 10, so that each image block is decomposed into four sub-image blocks. To be more specific, the DWT unit 10 filters each image block in an x-axial direction, so that the filtered image block is decomposed into two sub-image blocks, one of which is for a low frequency component L and the other for a high frequency component H. Further, the DWT unit 10 filters each of the two sub-image blocks for the low and high frequency components in a y-axial direction to decompose it into two sub-image blocks again, in other words, into four sub-image blocks.

The four sub-image blocks decomposed by the DWT unit 10 are classified into bands LL, LH, HL and HH, respectively. Here, the sub-image of band LL is a low frequency component having a resolution decreased by one half, compared with that of the image, which has not been decomposed into sub-images, and has high concentration of energy and important image information. The sub-images of bands LH, HL and HH are high frequency components having an edge component for a horizontal, vertical or diagonal image component and have low concentration of energy and detailed image information corresponding to an outline portion of image.

The DWT unit 10 decomposes the sub-image of band LL, which has high concentration of energy among four decomposed sub-images, into four sub-images again. The DWT unit 10 repeats this image decomposition process, so that the sub-image of band LL is decomposed into four sub-images step-by-step. This image decomposition process is called a "multi-resolution decomposition". In this case, concentration of energy occurs at a minimum band of the multi-resolution decomposed images. Further, the multi-resolution decomposed images have different frequency characteristics from each other. In FIG. 2, a reference numeral 34 represents the image obtained by decomposing each image block three times. Here, the process of decomposing each image block three times is called "three-level decomposition."

Figure 3:
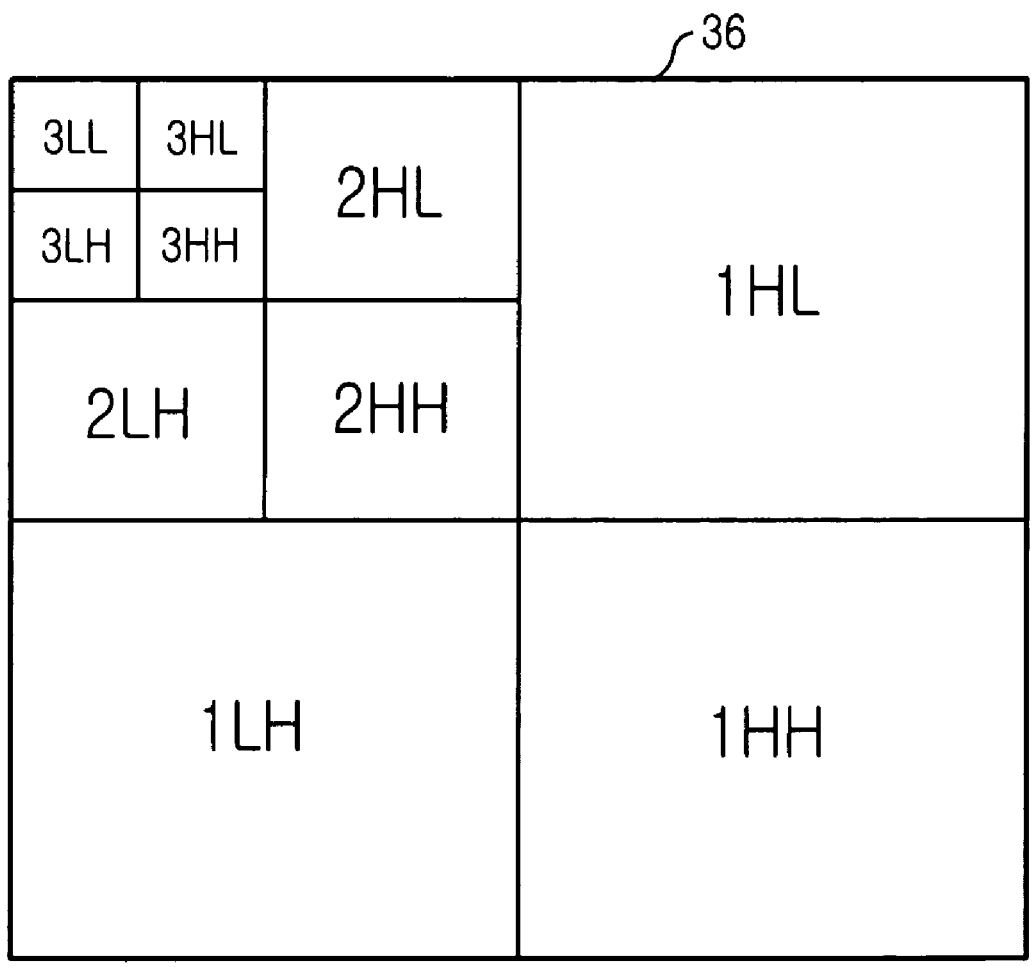
FIG. 3 is a block diagram showing one image block, which is subjected to three-level decomposition at the DWT unit 10.

FIG. 3 shows one image block subjected to three-level decomposition at the DWT unit 10. The DWT unit 10 performs primary decomposition, or one-level decomposition, relative to one image block, so that the image block is decomposed into four sub-images of bands 1LL, 1LH, 1HL and 1HH. Then, the DWT unit 10 performs secondary decomposition (or two-level decomposition) relative to the sub-image of band 1LL among four sub-images decomposed by the one-level decomposition, so that the sub-image of band 1LL is decomposed into four sub-images of bands 2LL, 2LH, 2HL and 2HH again. Finally, the DWT unit 10 performs tertiary decomposition (or three-level decomposition) relative to the sub-image of band 2LL among the four sub-images decomposed by the two-level decomposition, so that the sub-image of the band 2LL is decomposed into four sub-images of bands 3LL, 3LH, 3HL and 3HH again.

All of these decomposed sub-images are compressed by the quantizer 12 and the variable length encoder 14 of FIG. 1, and then restored by the variable length decoder 24, the de-quantizer 22 and IDWT unit 20. In other words, in the conventional JPEG still image compression method, a still image is decomposed by a preset level of decomposition regardless of importance and complexity of a source image, and then all the decomposed images are encoded and compressed. As a result, there is a problem in that the calculation procedure and circuitry needed to compress the image become complicated.

Figure 4:
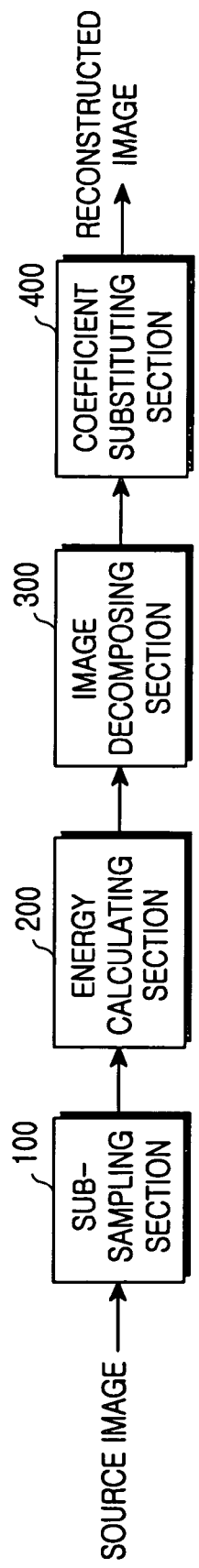
FIG. 4 is a block diagram showing a preferred embodiment of a DWT unit for compressing still images in accordance with the present invention.

FIG. 4 is a block diagram showing a preferred embodiment of a DWT unit for compressing still images in accordance with the present invention. As shown, the DWT unit comprises a sub-sampling section 100, an energy calculating section 200, an image decomposing section 300 and a coefficient substituting section 400.

When a source image is inputted, the sub-sampling section 100 performs sub-sampling of the inputted source image to reduce a size of the inputted source image by half. For instance, in the case where the source image has a pixel size of 256×256, when the source image is sub-sampled by the sub-sampling section 100, it is converted into sub-images, each of which has a pixel size of 128×128. The present invention may be applied both to the case of performing sub-sampling and to the case of not performing sub-sampling.

The energy calculation section 200 calculates energy relative to the image, the pixel size of which is reduced by half by the sub-sampling, in the unit of a block of a predetermined number of pixels, using Equation (1) given below. In the present embodiment, the energy is calculated in unit of a block having the pixel size of 16×16 or 32×32.

$$P_{MB} = \frac{1}{R^2} \sum_{x=0}^{R-1} \sum_{y=0}^{R-1} S \log S \qquad \text{Equation (1)}$$

where $P_{MB}$: energy of the image in the unit of the block,
R: the pixel size of the image, and
S=|f(x,y)−E(f)|,
where f(x,y): the value of the corresponding pixel of the image, and
E(f): mean value of pixels of the whole images within the block.

In the present embodiment, the pixel size, R, for calculating the energy at the energy calculating section 200 is 16 and 32.

The image decomposing section 300 determines the number of times of decomposition of the image based on the energy value calculated by the energy calculating section and then decomposes the image into four sub-images according to the determined number of times of decomposition. In decomposing the image, the image decomposing section 300 decomposes the image with the number of times of decomposition inversely proportional to the calculated energy value in terms of a pixel size of 16×16 or 32×32. That is, as the energy value become greater, the number of times of decomposition becomes smaller. As the energy value become smaller, the number of times of decomposition becomes larger.

In the present embodiment, the image decomposing section 300 equally divides a range of the energy values, or a range between the maximum value and 0 (zero), calculated by the energy calculating section 200, into three. Of the three equi-partitioned ranges of the energy values, one for the lowest energy values, one for the energy values nearest to 0 (zero), is called a "first energy level," one of the middle energy values is called a "second energy level," and one of the highest energy values is called a "third energy level."

Thus, the image decomposing section 300 checks to which one of the three equi-partitioned energy levels the energy value calculated by the energy calculating section 200 belongs. When the energy value of the corresponding block belongs to the third energy level, the image decomposing section 300 performs single decomposition, or one-level decomposition, relative to the corresponding block. When the energy value of the corresponding block belongs to the second energy level, the image decomposing section 300 performs one-level decomposition relative to the corresponding block. Further, when the energy value of the corresponding block belongs to the first energy level, the image decomposing section 300 performs two-level decomposition relative to the corresponding block. However, when the energy value of the corresponding block is a negative value due to the nature of the log function of Equation 1, the image decomposing section 300 performs three-level decomposition relative to the corresponding block. In short, when the JPEG still image is subjected to DWT, the corresponding block is decomposed with variable number of times according to importance of the image based on the energy value of the corresponding block, so that it is possible to decrease the calculation amount and time interval caused by encoding and decoding of the image.

The image decomposing section 300 may perform adaptive decomposition of the corresponding block according to the energy values of each block as in the present embodiment, but may perform overall three-level decomposition of the corresponding block. Whenever the blocks decomposed by the image decomposing section 300 are decomposed again, they are decomposed into sub-images of the bands LL, LH, HL and HH.

The coefficient substituting section 400 substitutes 0 (zero) for some blocks decomposed by the image decomposing section 300 according to the energy value, wherein each of the blocks is a band where a high frequency component is distributed in correspondence to the energy value. When the image decomposing section 300 performs adaptive decomposition according to the energy value of the corresponding block, the coefficient substituting section 400 substitutes 0 (zero) for a coefficient of the corresponding band as mentioned below. That is, when the energy value of the corresponding block belongs to the third energy level; and thus the corresponding block is subjected to one-level decomposition, the coefficient substituting section 400 substitutes 0 (zero) for a coefficient of band 1HH among the bands decomposed by the one-level decomposition.

When the energy value of the corresponding block belongs to the first energy level, and thus the corresponding block is subjected to two-level decomposition, the coefficient substituting section 400 substitutes 0 (zero) for coefficients of bands 1HH, 1HL, 1LH and 2HH among the bands decomposed by the two-level decomposition.

However, when the energy value of the corresponding block has a negative value due to the nature of the log function, and thus the corresponding block is subjected to three-level decomposition, the coefficient substituting section 400 substitutes 0 (zero) for the coefficients of the bands 1HH, 1HL, 1LH, 2HH and 3HH among the bands decomposed by the three-level decomposition.

In this manner, the reconstructed images are subjected to quantization for encoding and variable length encoding. Therefore, by sub-sampling the source image, performing three-level decomposition of each sub-sampled image block having a predetermined number of pixels, substituting 0 (zero) for the coefficients of the bands containing the high frequency component within the three-level decomposed blocks, the source image is reconstructed. As a result, it is possible not only to decrease calculation amount and time caused by encoding and decoding of the image, but also to further simplify a hardware-based construction.

Further, by sub-sampling the source image, calculating energy values relative to the sub-sampled source images in a unit of a block having a predetermined number of pixels, equally dividing a range between the minimum and maximum values of the calculated energy values into three, performing three-level decomposition of the block, and substituting 0 (zero) for the coefficients of some three-level decomposed bands according to which one of the three equi-partitioned ranges the energy value of the corresponding block belongs to, it is possible not only to decrease calculation amount and time needed to perform encoding and decoding of the images, but also to further simplify a hardware-based construction.

Moreover, by sub-sampling the source image, calculating the energy values relative to the sub-sampled source images in a unit of a block having a predetermined number of pixels, equally dividing a range between the minimum and maximum values of the calculated energy values into three, performing adaptive variable-level decomposition of the block according to which one of the three equi-partitioned ranges the energy value of the corresponding block belongs to, and substituting 0 (zero) for coefficients of bands having the high frequency component, it is possible not only to decrease calculation amount and time, which are necessary to perform encoding and decoding of the images, but also to further simplify a hardware-based construction.

The DWT unit of FIG. 4 according to the present invention may be equally applied to the IDWT unit, which performs IDWT in order to restore the compressed images.

Figure 5:
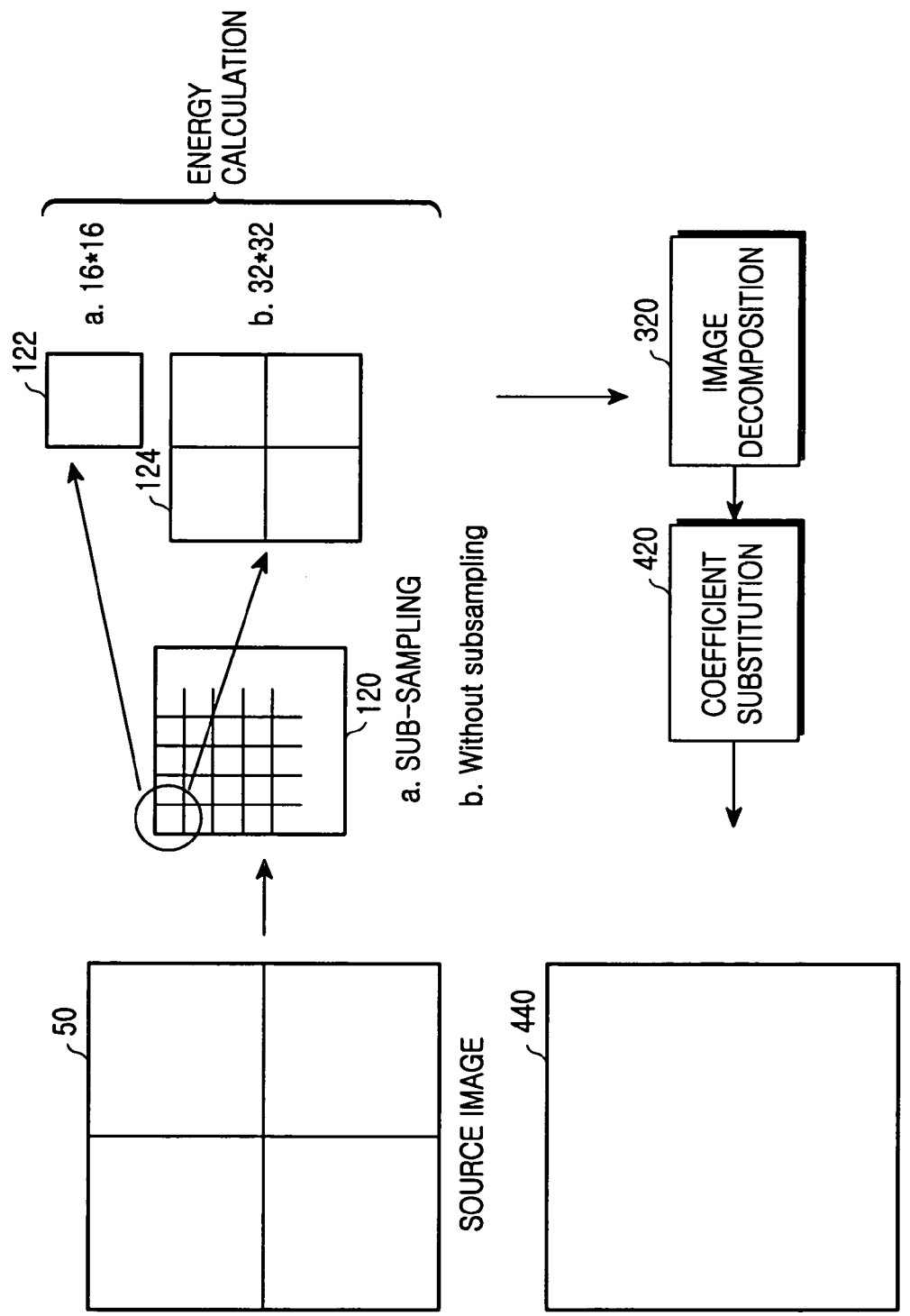
FIG. 5 is a block diagram showing an operation of each block in the DWT unit of FIG. 4.

FIG. 5 shows an operation of each block in the DWT unit of FIG. 4. When a source image 50 is inputted, a sub-sampling section 100 performs sub-sampling relative to the inputted source image 50 to obtain an image having a pixel size reduced by half. In this case, the sub-sampling section 100 may not perform sub-sampling relative to the source image 50.

An energy calculating section 200 calculates energy relative to the sub-sampled or non-sub-sampled image 120 in a unit of a block having a pixel size of 16×16 (122) or 32×32 (124). An image decomposing section 300 equally divides a range between the maximum and minimum values of the calculated energy into three, and verifies to which one of the three equi-partitioned ranges an energy value of the corresponding block belongs. The image decomposing section 300 performs adaptive variable-level decomposition of the corresponding block according to the range to which the energy value of the corresponding block belongs, as indicated by a reference numeral 320. A coefficient substituting section 400 determines a band to be substituted by 0 (zero) among the bands, which are subjected to variable-level decomposition according to the range to which the energy value of the corresponding block belongs, and then substitutes 0 (zero) for the band determined to be substituted among the decomposed bands (as indicated by a reference numeral 420). At this time, the coefficient substituting section 400 outputs an image, in which a predetermined band is substituted by 0 (zero) and reconstructed, as a block for quantization.

FIG. 6 shows one example, which may be subjected to adaptive variable-level decomposition at the image decomposing section 300 of FIG. 4. Specifically, FIG. 6A shows a one-level decomposed block, FIG. 6B shows a two-level decomposed block, and FIG. 6C shows a three-level decomposed block. That is, the image decomposing section 300 performs one-level decomposition as in FIG. 6A when the energy value of the corresponding block belongs to the first and second energy levels among the three energy levels of the three equi-partitioned ranges. The image decomposing section 300 performs two-level decomposition as in FIG. 6B when the energy value of the corresponding block belongs to a first energy level among three energy levels of three equi-partitioned ranges. The image decomposing section 300 performs three-level decomposition as in FIG. 6C when the energy value of the corresponding block has a negative value without belonging to any one of three energy levels of three equi-partitioned ranges.

In this manner, by adaptively performing variable-level decomposition according to the energy level of the corresponding block, it is possible to decrease calculation amount and time needed to perform the decomposition.

Figure 7:
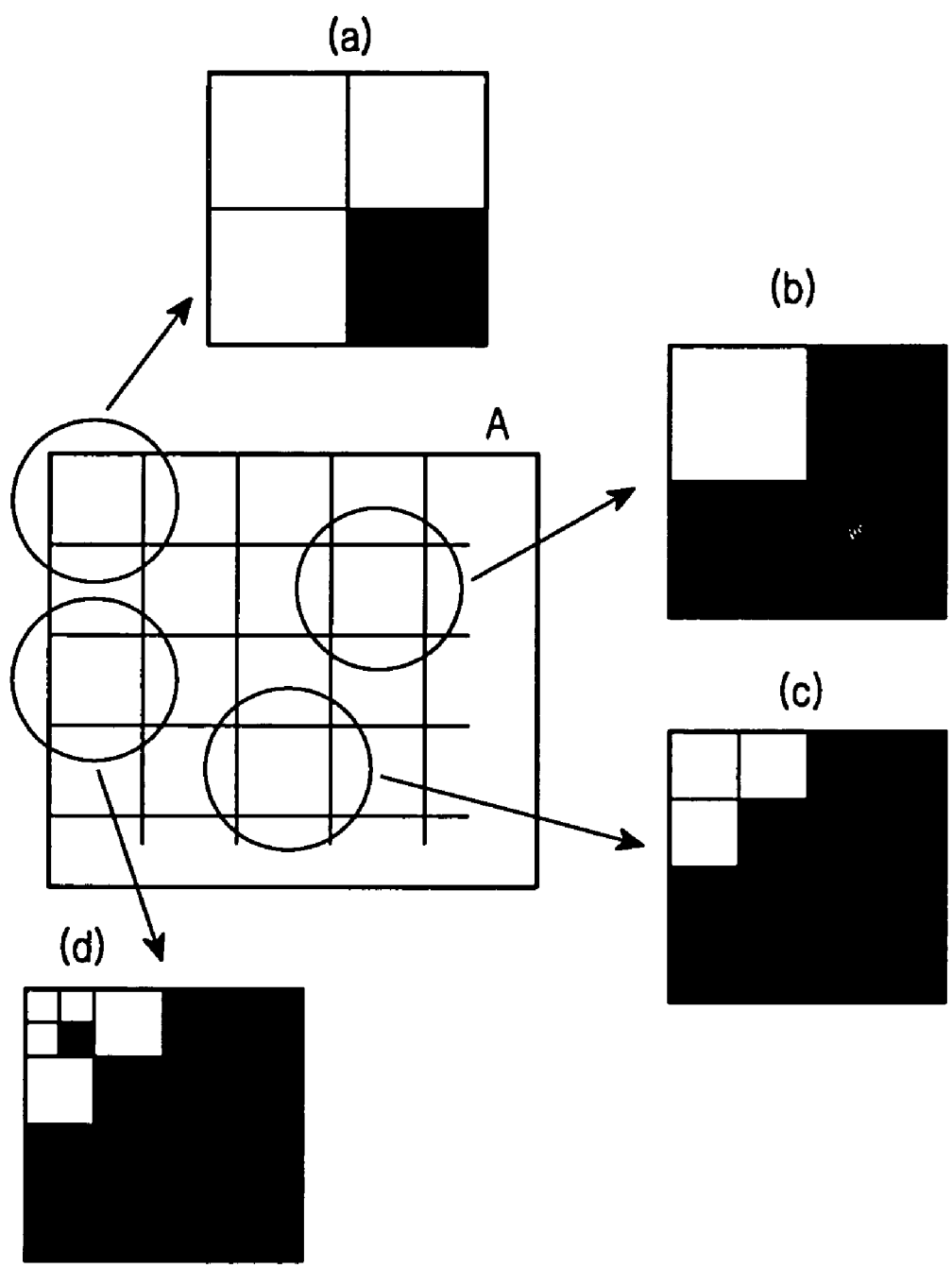
FIG. 7 is a block diagram showing one example in which a block is substituted by 0 (zero), wherein the block is subjected to adaptive variable-level decomposition at the image decomposing section of FIG. 4 and to variable-level decomposition.

FIG. 7 shows one example in which a block is substituted by 0 (zero) at the coefficient substituting section 400, wherein the block is subjected to adaptive variable-level decomposition by the image decomposing section 300 of FIG. 4 and variable-level decomposition. FIG. 7A shows a state in which, when the energy value of the corresponding block within a source image A is calculated by an energy calculating section 200 to belong to a third energy level, a band 1HH of high frequency bands is subjected to one-level decomposition by an image decomposing section 300, thus being substituted by 0 (zero) at the coefficient substituting section 400.

FIG. 7B shows a state in which, when the energy value of the corresponding block within a source image A is calculated by an energy calculating section 200 to belong to a second energy level, the bands 1HH, 1HL and 1LH of the high frequency bands are subjected to one-level decomposition by an image decomposing section 300, thus being substituted by 0 (zero) at the coefficient substituting section 400.

FIG. 7C shows a state in which, when the energy value of the corresponding block within a source image A is calculated by an energy calculating section 200 to belong to a first energy level, the bands 1HH, 1HL, 1LH and 2HH of the high frequency bands are subjected to two-level decomposition by an image decomposing section 300, thus being substituted by 0 (zero) at the coefficient substituting section 400.

FIG. 7D shows a state in which, when the energy value of the corresponding block within a source image A is calculated by an energy calculating section 200 to have a negative value, the bands 1HH, 1HL, 1LH, 2HH and 3HH of the high frequency bands are subjected to three-level decomposition by an image decomposing section 300, thus being substituted by 0 (zero) at the coefficient substituting section 400.

Figure 8:
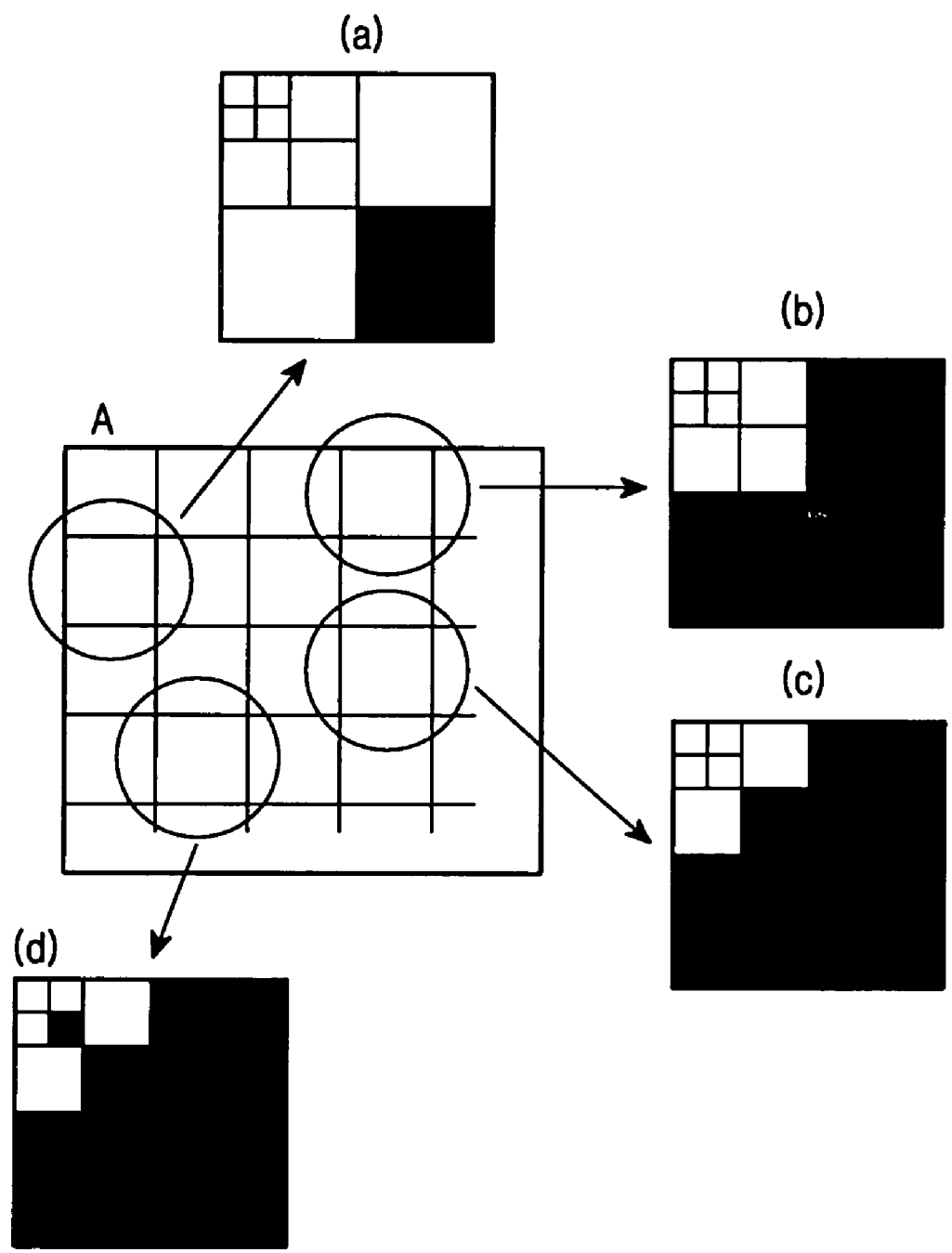
FIG. 8 is a block diagram showing one example in which a block is substituted by 0 (zero), wherein the block is subjected to three-level decomposition regardless of an energy level at the image decomposing section of FIG. 4, and to three-level decomposition

FIG. 8 shows one example in which a block is substituted by 0 (zero) at the coefficient substituting section 400, wherein the block is subjected to three-level decomposition regardless of an energy level at the image decomposing section 300 of FIG. 4, and three-level decomposition.

FIG. 8A shows a state in which, when the corresponding block within a source image A is subjected to three-level decomposition and the energy value of the corresponding block calculated by an energy calculating section 200 belongs to a third energy level, a band 1HH of the three-level decomposed bands is substituted by 0 (zero) at the coefficient substituting section 400.

FIG. 8B shows a state in which, when the corresponding block within a source image A is subjected to three-level decomposition and the energy value of the corresponding block calculated by an energy calculating section 200 belongs to a second energy level, the bands 1HH, 1HL and 1LH of the three-level decomposed bands are substituted by 0 (zero) at the coefficient substituting section 400.

FIG. 8C shows a state in which, when the corresponding block within a source image A is subjected to three-level decomposition and the energy value of the corresponding block calculated by the energy calculating section 200 belongs to a first energy level, the bands 1HH, 1HL, 1LH and 2HH of the three-level decomposed bands are substituted by 0 (zero) at the coefficient substituting section 400.

FIG. 8D shows a state in which, when the corresponding block within a source image A is subjected to three-level decomposition and the energy value of the corresponding block calculated by an energy calculating section 200 has a negative value, the bands 1HH, 1HL, 1LH, 2HH and 3HH of the three-level decomposed bands are subjected to three-level decomposition by an image decomposing section 300, thus being substituted by 0 (zero) at the coefficient substituting section 400.

Figure 9:
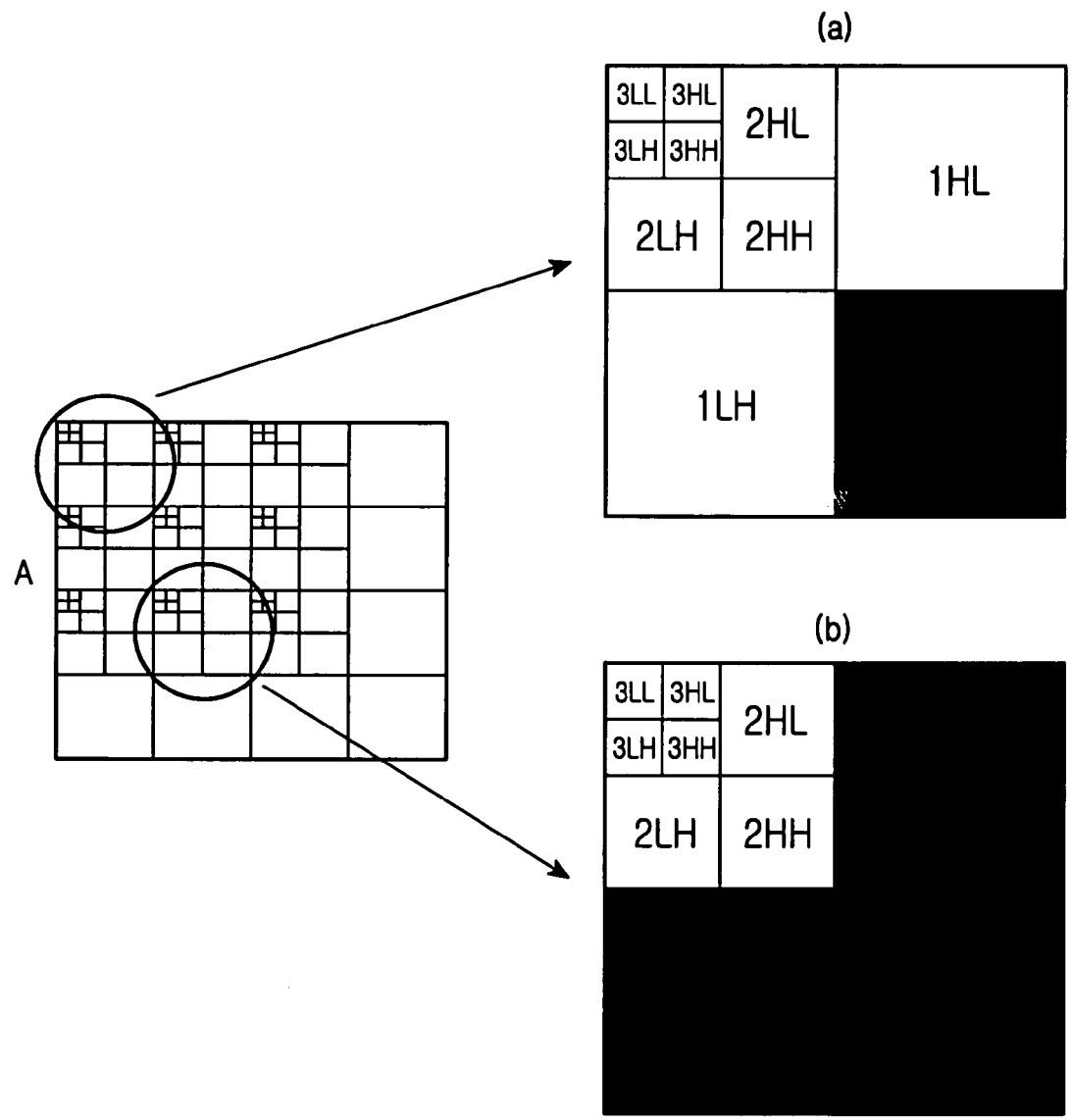
FIGS. 9 and 10 are block diagrams showing examples of performing coefficient substitution at the coefficient substituting section based on the energy value of the corresponding block calculated by the energy calculating section, relative to an image three-level decomposed by the image decomposing section of FIG. 4

FIG. 9 shows one example of performing coefficient substitution at the coefficient substituting section 400 based on the energy value of the corresponding block, which the energy calculating section 200 calculates relative to an image, which is subjected to three-level decomposition at the image decomposing section 300 of FIG. 4.

FIG. 9A shows a state in which, when the energy value of the corresponding block within a source image A is calculated by an energy calculating section 200 to belong to a third energy level, a band 1HH of the bands three-level decomposed by the coefficient substituting section 400 is substituted by 0 (zero).

FIG. 9B shows a state in which, when the energy value of the corresponding block within a source image A is calculated by an energy calculating section 200 to belong to a second energy level, the bands 1HH, 1HL and 1LH of the bands three-level decomposed by the coefficient substituting section 400 are substituted by 0 (zero).

Figure 10:
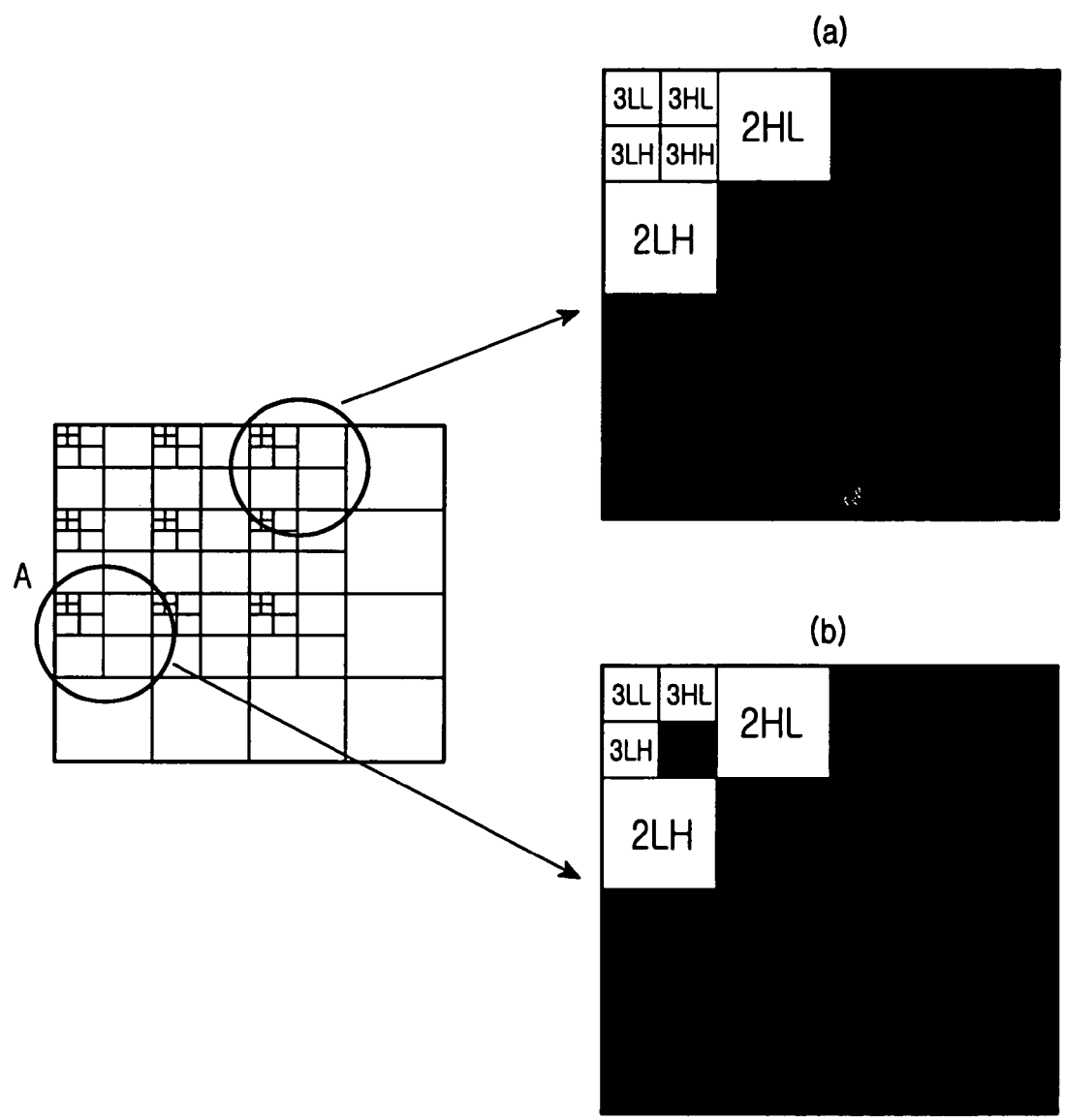

FIG. 10 shows one example of performing coefficient substitution at the coefficient substituting section 400 based on the energy value of the corresponding block, which the energy calculating section 200 calculates relative to an image, which is subjected to three-level decomposition at the image decomposing section 300 of FIG. 4.

FIG. 10A shows a state in which, when the energy value of the corresponding block within an source image A is calculated by an energy calculating section 200 to belong to a first energy level, the bands 1HH, 1HL, 1LH and 2HH of the bands three-level-decomposed by the coefficient substituting section 400 are substituted by 0 (zero).

FIG. 10B shows a state in which, when the energy value of the corresponding block within an source image A is calculated by an energy calculating section 200 to have a negative value, the bands 1HH, 1HL, 1LH, 2HH and 3HH of the bands three-level-decomposed by the coefficient substituting section 400 are substituted by 0 (zero).

Figure 11:
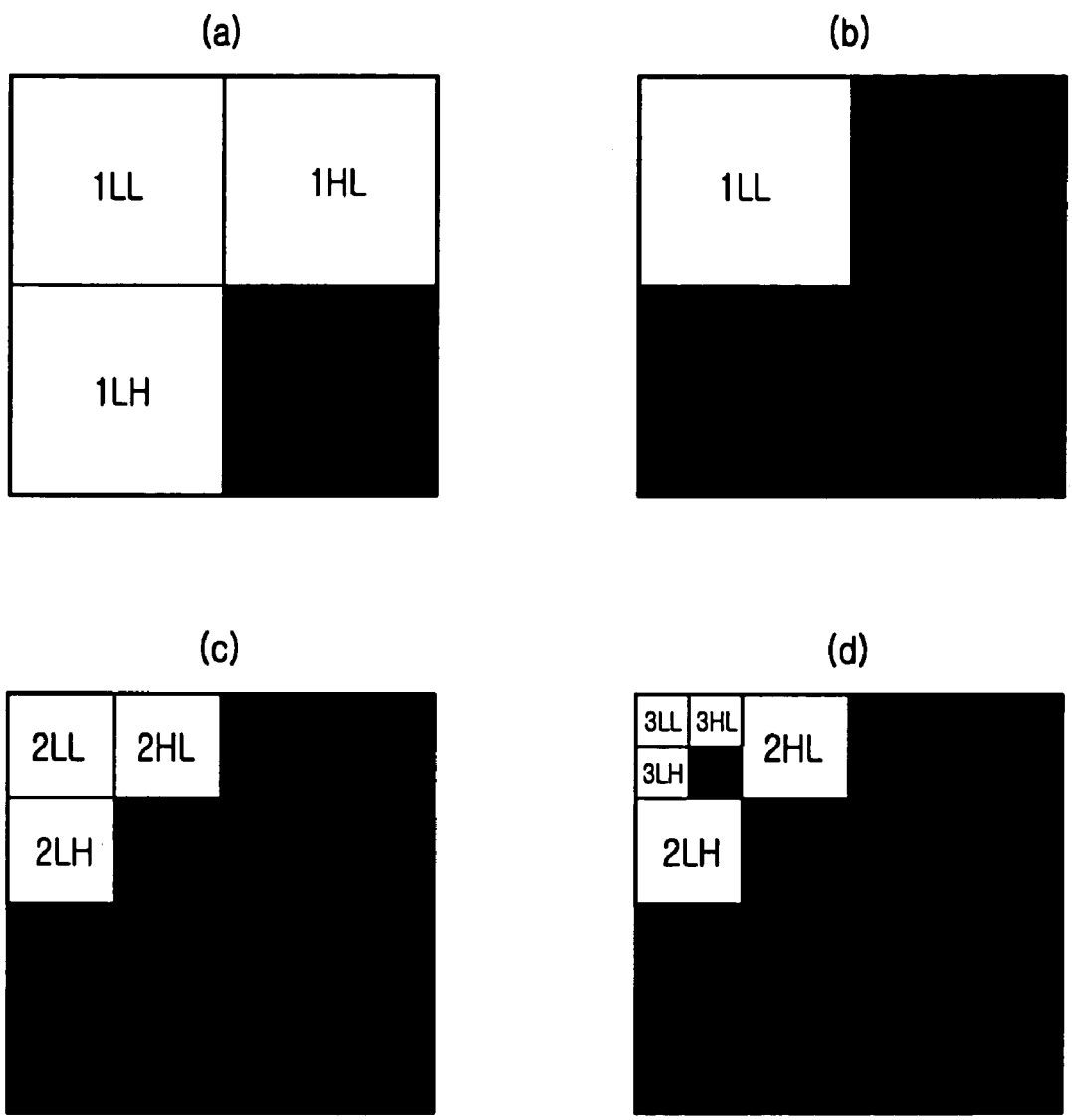
FIG. 11 is a block diagram showing one example of performing coefficient substitution at the coefficient substituting section based on the energy value of the corresponding block, relative to an image, which is subjected to adaptive variable-level decomposition according to an energy level at the image decomposing section of FIG. 4.

FIG. 11 shows one example of performing coefficient substitution at the coefficient substituting section 400 based on the energy value of the corresponding block, relative to an image, which is subjected to adaptive variable-level decomposition according to an energy level at the image decomposing section 300 of FIG. 4. FIG. 11 illustrates the example of performing substitution of the corresponding block shown in FIG. 7 in detail, thus providing a brief description.

FIG. 11A shows a state in which, when the energy value of the corresponding block calculated by an energy calculating section 200 belongs to a third energy level, a band 1HH is subjected to one-level decomposition by an image decomposing section 300, and then substituted by 0 (zero) at the coefficient substituting section 400.

FIG. 11B shows a state in which, when the energy value of the corresponding block calculated by an energy calculating section 200 belongs to a second energy level, the bands 1HH, 1HL and 1LH are subjected to one-level decomposition by an image decomposing section 300, and then substituted by 0 (zero) at the coefficient substituting section 400.

FIG. 11C shows a state in which, when the energy value of the corresponding block calculated by an energy calculating section 200 belongs to a first energy level, the bands 1HH, 1HL, 1LH and 2HH are subjected to two-level decomposition by an image decomposing section 300, and then substituted by 0 (zero) at the coefficient substituting section 400.

FIG. 11D shows a state in which, when the energy value of the corresponding block calculated by an energy calculating section 200 has a negative value, the bands 1HH, 1HL, 1LH, 2HH and 3HH are subjected to three-level decomposition by an image decomposing section 300, and then substituted by 0 (zero) at the coefficient substituting section 400.

Figure 12:
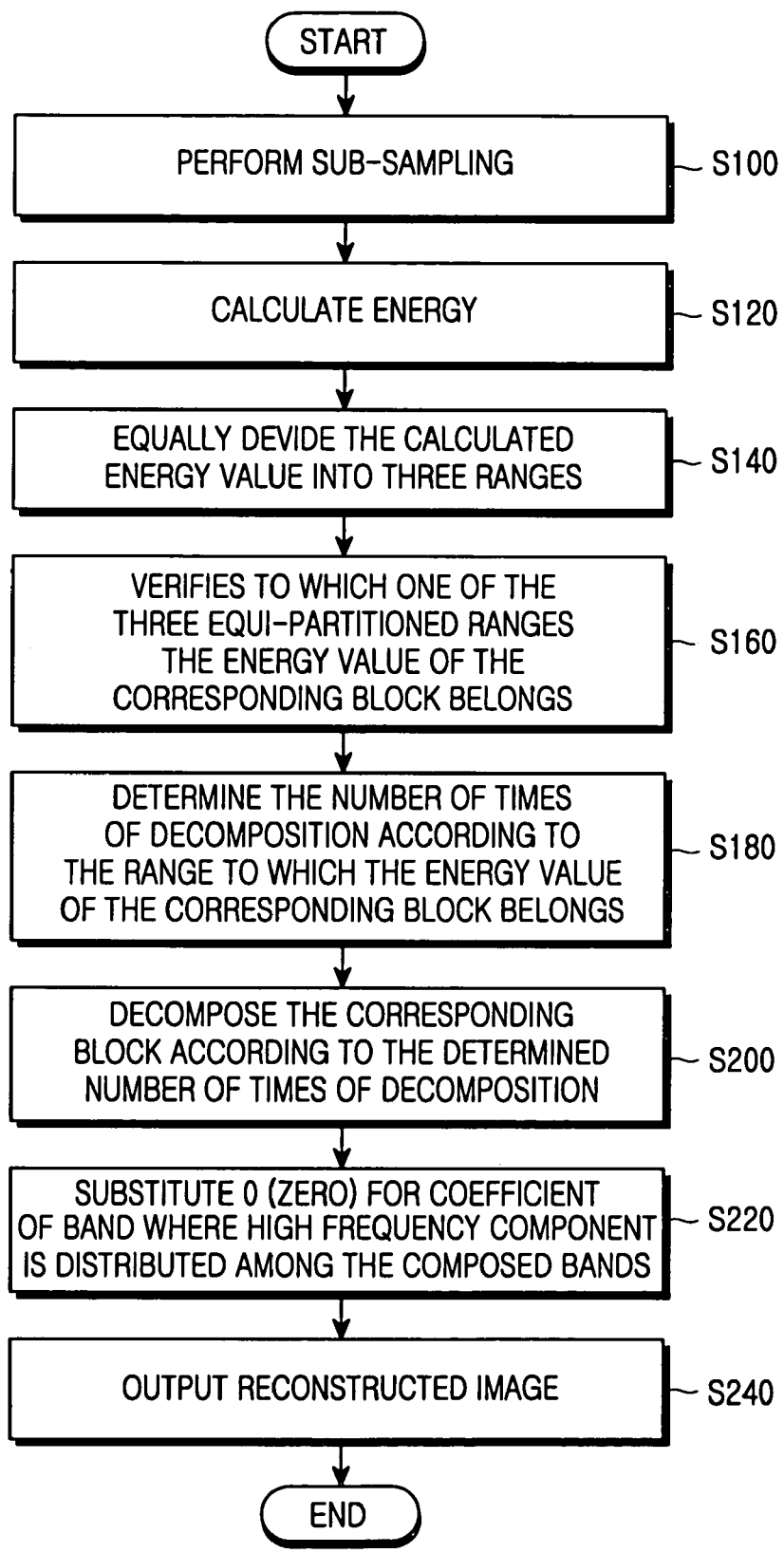
FIG. 12 is a flow chart showing a method for reconstructing a still image using a DWT unit in accordance with a preferred embodiment of the present invention.

FIG. 12 is a flow chart showing a method for reconstructing a still image using a DWT unit in accordance with a preferred embodiment of the present invention. First, when a source image is inputted the sub-sampling section 100 performs sub-sampling of the inputted source image to reduce a size of the inputted source image by half (step S100). The energy calculating section 200 calculates values of energy relative to the sub-sampled images in a unit of a block of a predetermined number of pixels using Equation 1 (step S120).

The image decomposing section 300 equally divides a range between the maximum and minimum ones of energy values calculated by the energy calculating section 200, into three ranges, and sets the three equi-partitioned ranges in an order of the energy value, i.e., a first energy level, a second energy level, and a third energy level (step S140). The image decomposing section 300 verifies to which one of the three equi-partitioned ranges an energy value of each block calculated by the energy calculating section 200 belongs. The image decomposing section 300 determines the number of times of decomposition according to the range to which the energy value of the corresponding block belongs (step S180). As a result, the image decomposing section 300 adaptively performs variable-level decomposition of the corresponding block according to the determined number of times of decomposition (step S200).

The coefficient substituting section 400 substitutes 0 (zero) for a coefficient of at least one band containing a high frequency component among the bands which are subjected to variable-level decomposition at the image decomposing section 300 (step S220). Thus, the coefficient substituting section 400 outputs an image, which is reconstructed by substituting 0 (zero) for a coefficient of the band containing the high frequency component, as a block for quantization. Being used in an IDWT unit, the coefficient substituting section 400 outputs an image, which is reconstructed by substituting 0 (zero) for a coefficient of band containing the high frequency component, as a block for display. That is, the present embodiment may be applied to the case of encoding a still image, as well as the case of decoding a still image.

Therefore, when a still image is subjected to DWT, by determining the number of times of variable-level decomposition according to importance of the image based on the energy value of the corresponding block, and by performing variable-level decomposition of the corresponding block, it is possible to decrease calculation amount and time interval caused by encoding and decoding of the image.

Figure 13:
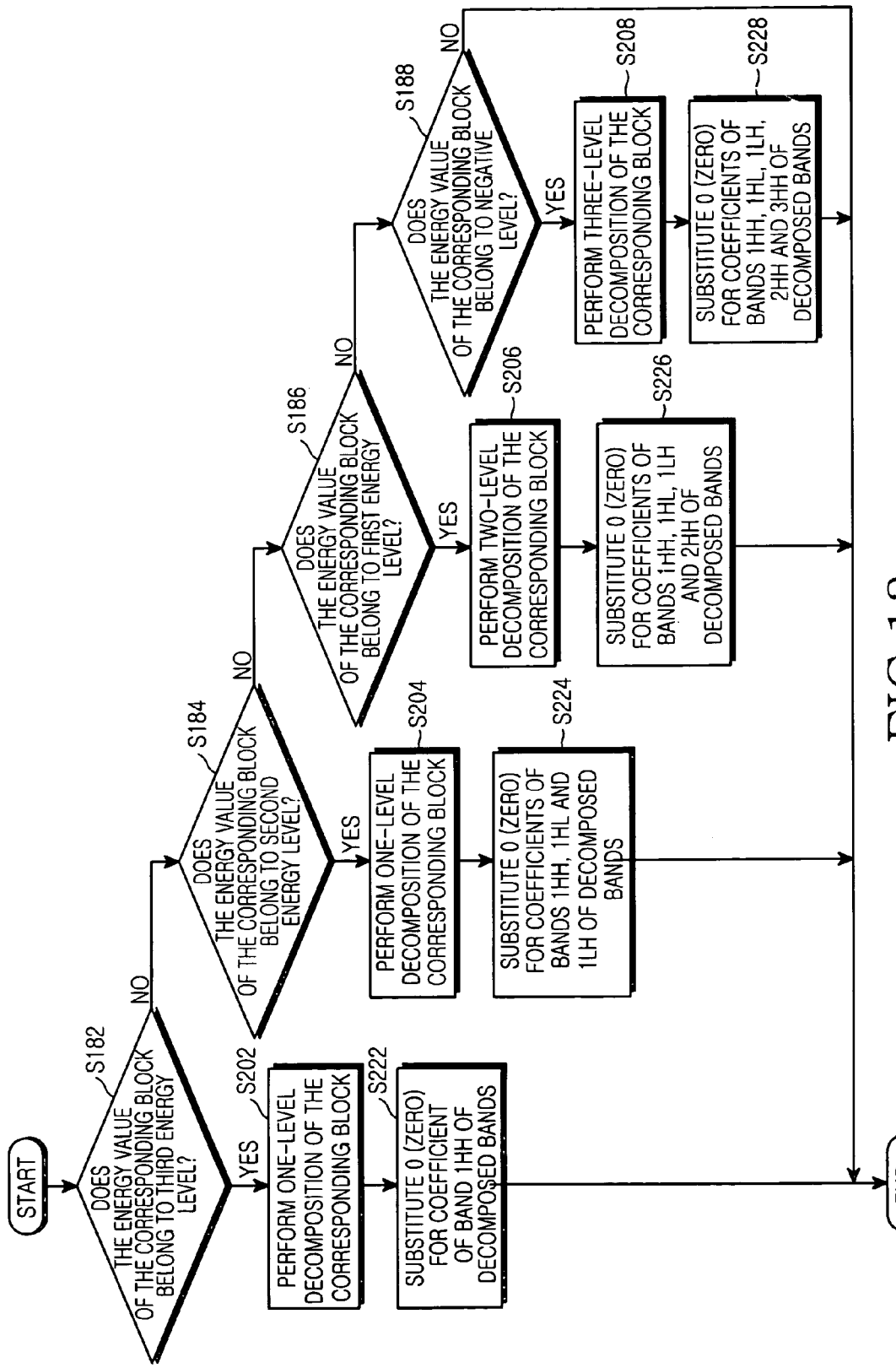
FIG. 13 is a flow chart showing steps S160 to S220 of FIG. 12 in detail.

FIG. 13 is a flow chart showing steps S160 to S220 of FIG. 12 in greater detail. First, the image decomposing section 300 verifies whether or not the energy value of the corresponding block belongs to the third energy level (step S182). If it is verified that the energy value of the corresponding block belongs to the third energy level, the image decomposing section 300 performs one-level decomposition of the corresponding block (step S202). Thus, the coefficient substituting section 400 substitutes 0 (zero) for a coefficient of band 1HH, at which a high frequency component is distributed, among the one-level decomposed bands (step S222).

If it is verified that the energy value of the corresponding block does not belong to the third energy level, the image decomposing section 300 verifies whether or not the energy value of the corresponding block belongs to the second energy level (step S184). If it is verified that the energy value of the corresponding block belongs to the second energy level, the image decomposing section 300 performs one-level decomposition of the corresponding block (step S204). Thus, the coefficient substituting section 400 substitutes 0 (zero) for coefficients of the bands 1HH, 1HL and 1LH, at which a high frequency component is distributed, among the one-level decomposed bands (step S224).

If it is verified that the energy value of the corresponding block does not belong to the second energy level, the image decomposing section 300 verifies whether or not the energy value of the corresponding block belongs to the first energy level (step S186). If it is verified that the energy value of the corresponding block belongs to the first energy level, the image decomposing section 300 performs two-level decomposition of the corresponding block (step S206). Thus, the coefficient substituting section 400 substitutes 0 (zero) for coefficients of the bands 1HH, 1HL, 1LH and 2HH, at which a high frequency component is distributed, among the two-level decomposed bands (step S226).

If it is verified that the energy value of the corresponding block does not belong to the first energy level, the image decomposing section 300 verifies whether or not the energy value of the corresponding block has the negative value (step S188). If it is verified that the energy value of the corresponding block has the negative value, the image decomposing section 300 performs three-level decomposition of the corresponding block (step S208). Thus, the coefficient substituting section 400 substitutes 0 (zero) for coefficients of the bands 1HH, 1HL, 1LH, 2HH and 3HH, at which a high frequency component is distributed, among the three-level decomposed bands (step S228).

Consequently, the corresponding block is subjected to adaptive variable level decomposition according to a magnitude of its energy value, so that it is possible to decrease calculation amount and time needed to perform encoding and decoding of the corresponding block.

According to the present invention, by not performing decoding of the whole wavelet coefficients in unit of a tile, classifying each image tile into a first level, a second level and a third level according to an energy level on a time axis, allowing coefficients of the bands (e.g., HH, HL, LH) for a high frequency component having minimum image information to be filled with 0 (zero), and performing decoding through IDWT again, it is possible not only to ensure a quality of image as high as possible, but also to decrease an amount of calculation for restoring images. That is, by neglecting image tiles containing a high frequency component to a proper extent to perform zero-filling of the neglected image tiles, and adaptively performing IDWT using only remaining wavelet image coefficients excluded from the zero-filling, it is possible to at least ensure a quality of restored images as well as a picture signal-to-noise ratio (PSNR).

Further, when a still image is subjected to encoding and decoding, the still image is tiled, and coefficients of tiles containing a high frequency component are processed into a value of 0 (zero). Thus, it is possible to decrease an amount of calculation for performing encoding and decoding of the image, to enhance a processing speed, and to further simplify a hardware-based construction.

Moreover, when at least one still image needs to be generated, stored and transmitted, wherein the still image is photographed by a camera phone, which is provided with a camera and allows for wireless mobile communication with a limited band assigned for communication, a digital camera and so on, the still image is subjected to tiling, and coefficients of tiles containing a high frequency component is processed into a value of 0 (zero), and only coefficients of the other tiles are subjected to encoding and decoding. Thus, it is possible to further simplify a hardware-based construction. As a result, it is possible to provide compact products and to lower production costs.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A discrete wavelet transform (DWT) unit for encoding and decoding a still image, comprising:
    an energy calculating section for calculating energy of an input image in a unit of a block having a predetermined number of pixels;
    an image decomposing section for performing three-level decomposition of the image of the block by decomposing a band, at which a low frequency component is distributed three times,
    wherein a range of the calculated energy is divided into three partitioned ranges, such that the three partitioned ranges are respectively assigned into a first energy level, a second energy level and a third energy level in an order of a magnitude of the energy; and
    a coefficient substituting section for substituting 0 (zero) for a coefficient of at least one band in which a high frequency component is distributed among the three-level decomposed bands according to the range to which a value of the energy of the corresponding block belongs.

2. A discrete wavelet transform (DWT) unit according to claim 1, wherein the energy calculating section calculates the energy in a unit of the block as follows:

$$P_{MB} = \frac{1}{R^2} \sum_{x=0}^{R-1} \sum_{y=0}^{R-1} S \log S$$

where $P_{MB}$: energy of the image in unit of the block,
R: pixel size of the image, and
$S = |f(x,y) - E(f)|$,
where $f(x,y)$: value of the corresponding pixel of the image, and
$E(f)$: mean value of all the pixels of the image within the block.

3. A discrete wavelet transform (DWT) unit according to claim 1, further comprising a sub-sampling section for performing sub-sampling of reducing a pixel size of the input image by half before the energy calculating section calculates the energy of the input image.

4. A discrete wavelet transform (DWT) unit according to claim 1, wherein, when the energy value of the corresponding block belongs to the third energy level, the coefficient substituting section substitutes 0 (zero) for a coefficient of a band 1HH of the three-level decomposed bands.

5. A discrete wavelet transform (DWT) unit according to claim 1, wherein, when the energy value of the corresponding block belongs to the second energy level, the coefficient substituting section substitutes 0 (zero) for coefficients of bands 1HH, 1HL and 1LH of the three-level decomposed bands.

6. A discrete wavelet transform (DWT) unit according to claim 1, wherein, when the energy value of the corresponding block belongs to the first energy level, the coefficient substituting section substitutes 0 (zero) for coefficients of bands 1HH, 1HL, 1LH and 2HH of the three-level decomposed bands.

7. A discrete wavelet transform (DWT) unit according to claim 1, wherein, when the energy value of the corresponding block is a negative value, the coefficient substituting section substitutes 0 (zero) for coefficients of bands 1HH, 1HL, 1LH, 2HH and 3HH of the three-level decomposed bands.

8. A discrete wavelet transform (DWT) unit for encoding and decoding a still image, comprising:
    an energy calculating section for calculating energy of an input image in a unit of a block having a predetermined number of pixels;
    an image decomposing section for performing adaptive variable-level decomposition of a corresponding block according to a magnitude of energy value calculated in a unit of the block; and
    a coefficient substituting section for substituting 0 (zero) for bands, at which a high frequency component is distributed among the adaptive variable-level decomposed bands based on an energy value of the corresponding block and performing image reconstruction.

9. A discrete wavelet transform (DWT) unit according to claim 8, further comprising a sub-sampling section for performing sub-sampling of reducing a pixel size of the input image by half before the energy calculating section calculates the energy of the input image.

10. A discrete wavelet transform (DWT) unit according to claim 8, wherein the corresponding block decomposed by the image decomposing section is adaptively preformed by any one of one-level decomposition, two-level decomposition and three-level decomposition.

11. A discrete wavelet transform (DWT) unit according to claim 10, wherein the image decomposing section equally divides a range between maximum and minimum values of the energy calculated by the energy calculating section into three equi-partitioned ranges, and sets the three equi-partitioned ranges into a first energy level, a second energy level and a third energy level in an order of a magnitude of the energy, and determines a decomposition level according to which level the energy level of the corresponding block belongs to.

12. A discrete wavelet transform (DWT) unit according to claim 11, wherein, according to the range to which the energy value of the corresponding block belongs, the coefficient substituting section substitutes 0 (zero) for a coefficient of at least one band, at which a high frequency component is distributed, among the adaptive variable-level decomposed bands.

13. A discrete wavelet transform (DWT) unit according to claim 12, wherein, when the energy value of the corresponding block belongs to the third energy level, the image decomposing section performs one-level decomposition of the corresponding block, and the coefficient substituting section substitutes 0 (zero) for a coefficient of a band 1HH of the one-level decomposed bands.

14. A discrete wavelet transform (DWT) unit according to claim 12, wherein, when the energy value of the corresponding block belongs to the second energy level, the image decomposing section performs one-level decomposition of the corresponding block, and the coefficient substituting section substitutes 0 (zero) for coefficients of bands 1HH, 1HL and 1LH of the one-level decomposed bands.

15. A discrete wavelet transform (DWT) unit according to claim 12, wherein, when the energy value of the corresponding block belongs to the first energy level, the image decomposing section performs two-level decomposition of the corresponding block, and the coefficient substituting section substitutes 0 (zero) for coefficients of bands 1HH, 1HL, 1LH and 2HH of the two-level decomposed bands.

16. A discrete wavelet transform (DWT) unit according to claim 12, wherein, when the energy value of the corresponding block belong to a negative value, the image decomposing section performs three-level decomposition of the corresponding block, and the coefficient substituting section substitutes 0 (zero) for coefficients of bands 1HH, 1HL, 1LH, 2HH and 3HH of the three-level decomposed bands.

17. A method for reconstructing a still image using a discrete wavelet transform (DWT) unit for encoding and decoding the still image, the method comprising:
a) calculating energy of an input image in a unit of a block having a predetermined number of pixels;
b) performing three-level decomposition of a band, at which a low frequency component is distributed, relative to the image of the block,
wherein a range of the calculated energy is divided into three partitioned ranges, such that the three partitioned ranges are respectively assigned into a first energy level, a second energy level and a third energy level in an order of a magnitude of the energy; and
c) substituting 0 (zero) for a coefficient of at least one band in which a high frequency component is distributed among the three-level decomposed bands according to the range to which a value of the energy of the corresponding block belongs.

18. A method according to claim 17, wherein, in step (a), the energy is calculated in a unit of the block as follows:

$$P_{MB} = \frac{1}{R^2} \sum_{x=0}^{R-1} \sum_{y=0}^{R-1} S \log S$$

where $P_{MB}$: energy of the image in unit of the block,
R: pixel size of the image, and
$S=|f(x,y)-E(f)|$,
where $f(x,y)$: value of the corresponding pixel of the image, and
$E(f)$: mean value of all the pixels of the image within the block.

19. A method according to claim 17, further comprising a step of performing sub-sampling of reducing a pixel size of the input image by half at a sub-sampling section before step (a).

20. A method according to claim 17, wherein in step (c), when the energy value of the corresponding block belongs to the third energy level, a coefficient of a band 1HH of the three-level decomposed bands is substituted by 0 (zero).

21. A method according to claim 17, wherein in step (c), when the energy value of the corresponding block belongs to the second energy level, coefficients of bands 1HH, 1HL and 1LH of the three-level decomposed bands are substituted by 0 (zero).

22. A method according to claim 17, wherein in step (c), when the energy value of the corresponding block belongs to the first energy level, coefficients of bands 1HH, 1HL, 1LH and 2HH of the three-level decomposed bands are substituted by 0 (zero).

23. A method according to claim 17, wherein in step (c), when the energy value of the corresponding block is a negative value, coefficients of bands 1HH, 1HL, 1LH, 2HH and 3HH of the three-level decomposed bands are substituted by 0 (zero).

24. A method for reconstructing a still image using discrete wavelet transform (DWT) unit for encoding and decoding the still image, the method comprising the steps of:
calculating energy of an input image in unit of a block of a predetermined number of pixels at an energy calculating section;
performing adaptive variable-level decomposition of the corresponding block according to a magnitude of energy value calculated in a unit of the block at an image decomposing section; and
substituting 0 (zero) for bands at which a high frequency component is distributed among the adaptive variable-level decomposed bands based on an energy value of the corresponding block and performing image reconstruction at a coefficient substituting section.

25. A method according to claim 24, further comprising a step of performing sub-sampling of reducing a pixel size of the input image by half before the energy is calculated in step (a).

26. A method according to claim 24, wherein the corresponding block decomposed in step (b) is adaptively preformed by any one of one-level decomposition, two-level decomposition and three-level decomposition.

27. A method according to claim 26, wherein in step (b), a range between maximum and minimum values of the calculated energy is equally divided into three ranges to be set into a first energy level, a second energy level and a third energy level in an order of a magnitude of the energy, and a decomposition level is determined according to which level the energy level of the corresponding block belongs to.

28. A method according to claim 27, wherein in step (c), a coefficient of at least one band, at which a high frequency component is distributed, among the adaptive variable-level decomposed bands is substituted by 0 (zero) according to the range to which the energy value of the corresponding block belongs.

29. A method according to claim 28, wherein, when the energy value of the corresponding block calculated in step (a) belongs to the third energy level,
the corresponding block is subjected to one-level decomposition in step (b), and
a coefficient of a band 1HH of the one-level decomposed bands is substituted by 0 (zero) in step (c).

30. A method according to claim 28, wherein, when the energy value of the corresponding block calculated in step (a) belongs to the second energy level,
the corresponding block is subjected to one-level decomposition in step (b), and
coefficients of bands 1HH, 1HL and 1LH of the one-level decomposed bands are substituted by 0 (zero) in step (c).

31. A method according to claim 28, wherein, when the energy value of the corresponding block calculated in step (a) belongs to the first energy level,
the corresponding block is subjected to two-level decomposition in step (b), and
coefficients of bands 1HH, 1HL, 1LH and 2HH of the two-level decomposed bands are substituted by 0 (zero) in step (c).

32. A method according to claim 28, wherein, when the energy value of the corresponding block calculated in step (a) belongs to a negative value, the corresponding block is subjected to three-level decomposition in step (b), and coefficients of bands 1HH, 1HL, 1LH, 2HH and 3HH of the three-level decomposed bands are substituted by 0 (zero) in step (c).

* * * * *